US011788420B2

(12) United States Patent
Gondre et al.

(10) Patent No.: US 11,788,420 B2
(45) Date of Patent: Oct. 17, 2023

(54) FAN BLADE COMPRISING AN INSERT OF STIFF FIBERS

(71) Applicant: Safran Aircraft Engines, Paris (FR)

(72) Inventors: Guillaume Pascal Jean-Charles Gondre, Moissy-Cramayel (FR); Thomas Alain De Gaillard, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/909,175

(22) PCT Filed: Mar. 3, 2021

(86) PCT No.: PCT/FR2021/050358
§ 371 (c)(1),
(2) Date: Sep. 2, 2022

(87) PCT Pub. No.: WO2021/176179
PCT Pub. Date: Sep. 10, 2021

(65) Prior Publication Data
US 2023/0088650 A1    Mar. 23, 2023

(30) Foreign Application Priority Data
Mar. 3, 2020   (FR) ...................................... 2002126

(51) Int. Cl.
*F01D 5/28*  (2006.01)
*F01D 5/14*  (2006.01)

(52) U.S. Cl.
CPC ............ *F01D 5/282* (2013.01); *F01D 5/147* (2013.01); *F05D 2220/32* (2013.01); *F05D 2240/30* (2013.01); *F05D 2300/6034* (2013.01)

(58) Field of Classification Search
CPC . F01D 5/282; F01D 5/28; F01D 5/284; F01D 5/14; F01D 5/147; F01D 25/005;
(Continued)

(56) References Cited

U.S. PATENT DOCUMENTS

| | | | |
|---|---|---|---|
| 9,670,788 B2 * | 6/2017 | Hoyland | ............... F04D 29/023 |
| 10,180,069 B2 * | 1/2019 | Coupe | ..................... B29C 70/24 |

(Continued)

FOREIGN PATENT DOCUMENTS

| | | |
|---|---|---|
| FR | 2 953 225 A1 | 6/2011 |
| FR | 2 955 609 A1 | 7/2011 |

OTHER PUBLICATIONS

French Search Report for French Application No. 2002126, dated Sep. 10, 2020.
(Continued)

*Primary Examiner* — Woody A Lee, Jr.
*Assistant Examiner* — Behnoush Haghighian
(74) *Attorney, Agent, or Firm* — BIRCH, STEWART, KOLASCH & BIRCH, LLP

(57) ABSTRACT

The present invention relates to a fan blade (3) having a structure made from a composite material, comprising a fibrous reinforcement (5), which is obtained by three-dimensional weaving of warp strands and weft strands, and a matrix in which the fibrous reinforcement (5) is embedded, wherein—the fibrous reinforcement (5) comprises a first portion (14) forming the trailing edge (9) of the structure made from a composite material and a second portion (15) forming its leading edge (8), and wherein—the warp strands of the fibrous reinforcement (5) comprise first strands (12) having a predetermined stiffness and second strands (13) having a greater stiffness than that of the first strands (12), the first portion (14) comprising all or part of the first strands (12) and being devoid of second strands (13) while the
(Continued)

second portion (15) comprises all or part of the second strands (13).

15 Claims, 4 Drawing Sheets

(58) Field of Classification Search
CPC ...... F04D 29/324; F04D 29/38; F04D 29/388; F04D 29/02; F04D 29/023; F05D 2300/603; F05D 2300/6031; F05D 2300/6032; F05D 2300/6033; F05D 2300/6012; B29C 70/24; B29L 2031/082; D03D 25/005
See application file for complete search history.

(56) References Cited

U.S. PATENT DOCUMENTS

| | | | |
|---|---|---|---|
| 2013/0017094 A1* | 1/2013 | Coupe | F01D 5/187 |
| | | | 29/889.71 |
| 2014/0286765 A1* | 9/2014 | Hoyland | F01D 9/041 |
| | | | 415/200 |
| 2016/0032939 A1* | 2/2016 | Anderson | B29C 70/48 |
| | | | 156/60 |

OTHER PUBLICATIONS

International Search Report for International Application No. PCT/FR2021/050358, dated Jun. 30, 2021.

* cited by examiner

FAN BLADE COMPRISING AN INSERT OF STIFF FIBERS

TECHNICAL FIELD

The disclosure generally relates to the field of turbomachines, and more particularly the field of the fan blades of these turbomachines and their manufacturing method.

The disclosure applies more particularly to the fan blades made of composite material and their interaction with the inlet of the primary flowpath.

BACKGROUND

The turbomachine blades, and in particular the fan blades, undergo significant mechanical and thermal stresses and must meet strict weight and bulk conditions. It has therefore been proposed to use blades in a composite material including a fibrous reinforcement densified by a polymer matrix, which are lighter compared to metal blades with equivalent propulsive characteristics and which have satisfactory heat resistance.

Such composite material blades comprise, in a manner known per se, a structure made of composite material comprising a fibrous reinforcement obtained by three-dimensional weaving and a matrix in which the fibrous reinforcement is embedded. This structure also forms a leading edge, a trailing edge, an intrados wall and an extrados wall.

A metal shield is generally added onto the leading edge of the vane in order to improve the resistance to ingestion of the blade in fast dynamics. However, statically, this shield brings stiffness and additional mass which increase the centrifugal forces in the vicinity of the leading edge.

Statically, each fan blade is subjected to a centrifugal loading and to the force of the aerodynamic pressures. The blade then deforms significantly and heterogeneously. Particularly, it appears that the leading edge of the blade moves more than its trailing edge.

In the case of a fan comprising blades made of composite material, the pitch angle is an important parameter for the aerodynamic performance of the fan blades. This pitch angle is defined as the angle, in the plane tangential to the platform of the fan blade, formed between the chord of the fan blade (that is to say this segment, in the tangential plane, connecting the leading edge and the trailing edge of the blade) and the axis of rotation of the fan. The greater the pitch angle, the more the fan blade is 'closed'. The lower the pitch angle, the more the blade is 'open'.

The pitch angle is an aerodynamic parameter optimized for the operating point in top of climb speed or in cruise speed in order to achieve the desired flow rate. The pitch angle at the other operating points results from a finite element calculation. The pitch angle can be plotted as a function of the blade height that is to say it changes between the root and the tip of the blade (due to its twisted shape).

It is also possible to plot a difference in pitch which corresponds to the difference of pitch angle between two given speeds. High values of difference in pitch angles are directly due to high values of displacements of the blade statically, in particular due to the untwisting of the blade resulting from the displacement of leading edge which is greater than the displacement of the trailing edge depending on the engine speed.

When designing a fan blade, one of the objectives of the aeromechanical iterations is to reduce the untwisting of the blade. For that, it is known to modify the vane laws, in particular the stacking laws according to the height and to the chord of the blade. However, these modifications may go in particular against aerodynamic performances.

Moreover, to improve the aerodynamics of the blade, it is preferable that the pitch angle be 'open' in top of climb phase (to ensure the flow rate) and 'closed' in partial phase and/or in climb phase for the surge/flutter margin.

However, in most fan blades made of composite materials, the difference in tangential displacement between the leading edge and the trailing edge of the blade is greater in climb phase than in top of climb phase. It follows that the opening of the pitch of the fan blade is greater in climb than in top of climb, and consequently that the pitch angle of the blade is greater in top of climb than in climb. The untwisting of the blade therefore penalizes its aerodynamic performance.

SUMMARY

One objective of the application is therefore to overcome the aforementioned drawbacks, by proposing a fan blade for a turbomachine whose displacement between the different operating phases of the engine is consistent with the aerodynamic performance desired, in particular in climb phase and in top of climb/cruise phase.

It is for this purpose proposed, according to a first aspect, a fan blade of a turbomachine comprising a composite material structure comprising a fibrous reinforcement obtained by three-dimensional weaving of warp strands and weft strands and a matrix in which the fibrous reinforcement is embedded, the composite material structure comprising a leading edge and a trailing edge, the fibrous reinforcement comprising a first portion forming the trailing edge and a second portion forming the leading edge, the warp strands of the fibrous reinforcement comprising first strands having a predefined stiffness.

The warp strands of the fiber reinforcement further comprise second strands having a stiffness greater than that of the first strands, the first portion comprising all or part of the first strands and being devoid of second strands while the second portion comprises all or part of the second strands.

Some preferred but non-limiting characteristics of the blade according to the first aspect are the following, taken individually or in combination:

the warp strands of the second portion further comprise first strands;

the blade further comprises an airfoil vane suitable for extending in an air stream having a tip and a root configured to be fixed to a disk of the fan, and in which the second portion extends over the entire height of the blade, from the root to the tip;

the blade further comprises an airfoil vane suitable for extending in an air stream having a tip and a root configured to be fixed to a disk of the fan, and in which the second portion extends over a chord length portion of the composite material structure which is variable between the root and the tip of the blade;

at the root of the blade, the second portion extends over a length comprised between 25% and 40% of the chord length of the composite material structure;

the blade further comprises a metal shield, added and fixed onto the leading edge, the second portion exceeding the metal shield at the root but being covered by the metal shield at the tip;

the second portion exceeds the metal shield of the root up to 40% to 50% of a height of the blade then is covered by the metal shield up to the tip;

at mid-height of the blade, the second portion extends over a length comprised between 10% and 30% of the chord length of the composite material structure;

at the tip of the blade, the second portion extends over a length comprised between 0% and 5% of the chord length of the composite material structure;

the fibrous reinforcement further comprises a third portion extending between the second portion and the first portion, a density of the second strands gradually decreasing in the third portion from the second portion to the first portion;

the third portion extends over a length comprised between 5% and 10% of the chord length of the composite material structure;

the blade further comprises a metal shield added and fixed onto the leading edge, said metal shield covering the second portion and revealing the first portion;

the second strands have a Young's modulus comprised between 1.2 and 1.5 times the Young's modulus of the first strands;

the first strands and the second strands comprise carbon fibers.

According to a second aspect, it is proposed a fan for a turbomachine comprising a plurality of blades in accordance with the first aspect and a turbomachine comprising such a fan.

According to a third aspect, it is proposed an aircraft comprising such a turbomachine.

DESCRIPTION OF THE FIGURES

Other characteristics, aims and advantages of the invention will emerge from the following description, which is purely illustrative and not limiting, and which should be read in relation to the appended drawings in which.

In all the figures, similar elements bear identical references.

DETAILED DESCRIPTION

Figure 1:
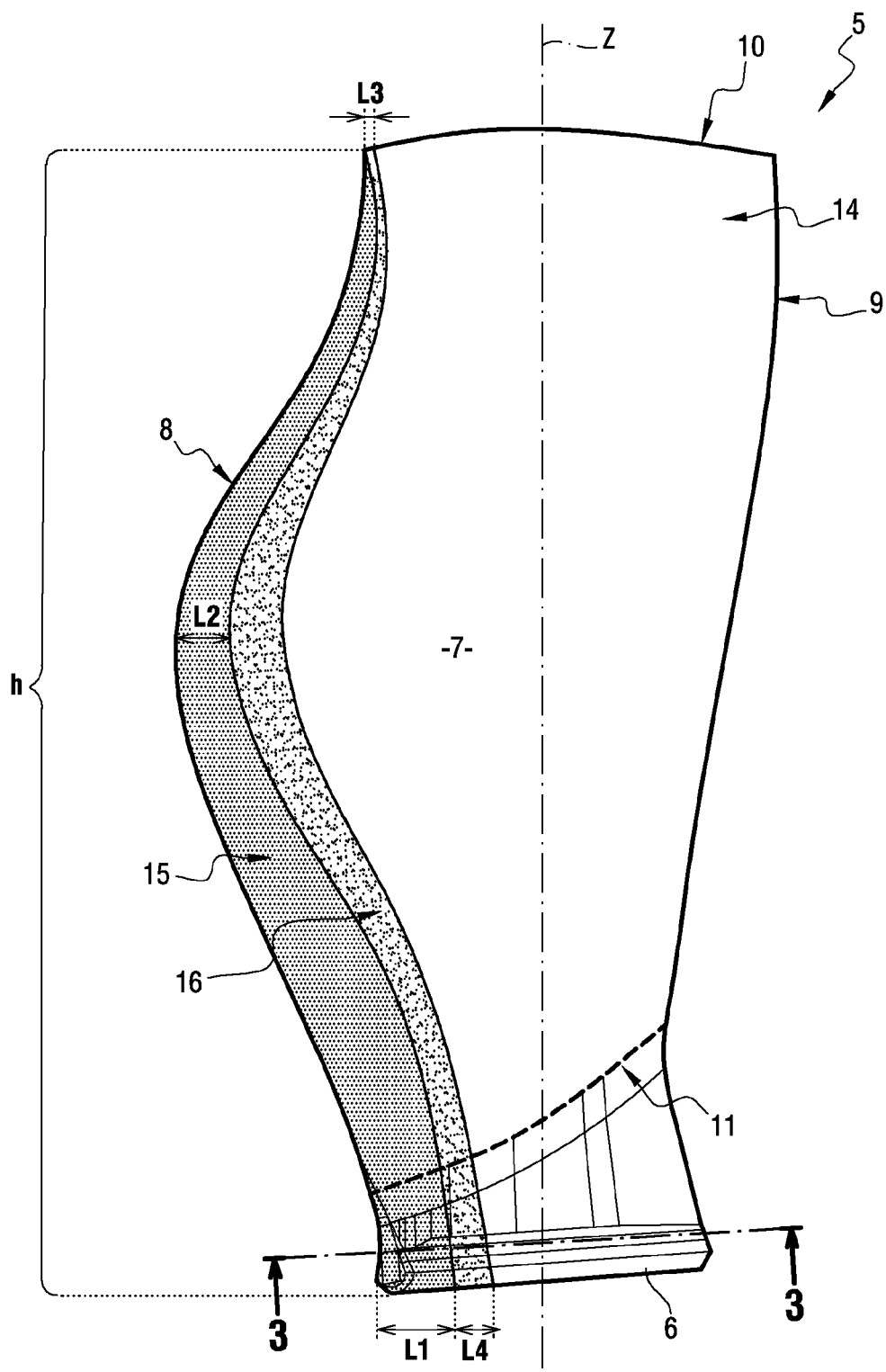
FIG. 1 schematically illustrates one exemplary embodiment of a fibrous reinforcement for a fan blade made of composite material in accordance with the invention.

In the present application, upstream and downstream are defined with respect to the normal flow direction of the gas in the fan 1 through the turbomachine. Furthermore, "axis of revolution of the fan 1" refers to the axis X of radial symmetry of the fan 1. The axial direction corresponds to the direction of the axis X of the fan 1, and a radial direction is a direction perpendicular to this axis and passing therethrough. Finally, "inner" and "outer" respectively will be used in reference to a radial direction so that the inner part or face of an element is closer to the axis X than the outer part or face of the same element.

A turbomachine fan 1 comprises a fan disk 2 carrying a plurality of fan blades 3 associated with inter-blade platforms.

Each blade 3 comprises a composite material structure including a fibrous reinforcement obtained by three-dimensional weaving and a matrix in which the fibrous reinforcement is embedded. By "three-dimensional weaving", it will be meant that the warp strands follow sinuous paths in order to bind weft strands together, it being noted that a three-dimensional weaving, in particular an interlock weave, can include two-dimensional weavings on the surface. Different three-dimensional weaves can be used, such as interlock, multi-satin or multi-canvas weaves, for example, as described in particular in document WO 2006/136755.

This composite material structure comprises a root 6, an airfoil vane 7 having a leading edge 8, a trailing edge 9 and a tip 10. The leading edge 8 is configured to extend facing the flow of gases entering the turbomachine. It corresponds to the anterior part of an airfoil which faces the air stream and which divides the air flow into an intrados flow and an extrados flow. The trailing edge 9 for its part corresponds to the posterior part of the airfoil, where the intrados and extrados flows meet.

Finally, the structure is formed of a plurality of blade sections stacked from the root 6 along a stacking axis Z extending radially with respect to the axis of revolution X of the fan 1.

The root 6 of each blade 3 is engaged in an axial groove formed in the fan disk 2. The airfoil vane 7 is for its part suitable for being placed in an air stream, when the engine is in operation so as to divide the air flow into an intrados flow and an extrados flow in order to generate lift. The blade 3 has a height h corresponding to a dimension along the stacking axis Z of the blade sections of a lower radial end of the root 6 and at the tip 10. The height h can for example be measured at the intersection between the leading edge 8 and the lower limit of the vane 7 (which corresponds to the junction between the leading edge 8 and the platform 11). In FIG. 1 which represents the fibrous reinforcement 5, the platform location 11 is symbolized by a dotted line.

In one embodiment, the blade 3 further comprises a metal shield 4 added and fixed onto the leading edge 8 in order to protect the blade 3 against, among other things, the ingestion of objects (such as birds).

The fibrous reinforcement 5 can be formed from a fibrous preform in one piece obtained by three-dimensional weaving. It comprises fibers which can in particular be made of carbon, glass, basalt or aramid. The matrix for its part is typically a polymer matrix, for example epoxy, bismaleimide or polyimide. The blade 3 is then formed by molding by means of a vacuum resin injection process of the RTM (Resin Transfer Molding), or VARTM (Vacuum Resin Transfer Molding) type.

The fibrous reinforcement 5 is formed by three-dimensional weaving of warp strands and weft strands. The warp strands comprise first strands 12 having a predefined stiffness, and second strands 13 having a predefined stiffness which is greater than that of the first strands 12. In one embodiment, the weft strands only comprise first strands 12.

The fibrous reinforcement 5 is therefore obtained by hybridization of the warp strands constituting it in order to make best use of the mechanical properties of each warp strand according to the areas of the blade 3 and to the type of load.

By "stiffness", it will be meant here the Young's modulus (E). In one embodiment, the stiffness of the second strands 13 is comprised between 1.2 and 1.5 times the stiffness of the first strands 12.

The first strands 12 and the second strands 13 have a high Young's modulus, for example greater than or equal to 250 GPa, and have the function of enabling to meet the design criteria for the blade 3, and in particular the frequency status of the blade 3. This thus allows limiting or at least moving away the frequency crossings between the first energy eigenmodes of the blade 3, and the engine harmonics. Furthermore, the addition of strands having a greater stiffness (the second strands 13) in the reinforcement 5 allows increasing the frequency of the first eigenmode mode of the blade 3.

The first strands 12 are therefore used in the weaving of all or part of the fibrous preform to form the reinforcement 5, including the portion of the reinforcement 5 (or first portion 14) which comprises the trailing edge 9. This first portion 14 of the reinforcement 5 is devoid of second strands 13.

The second strands 13, whose stiffness is greater than that of the first strands 12, have the function of reducing the untwisting of the vane 7 statically. These second strands 13 are therefore used in the weaving of the fibrous preform to form the portion of the reinforcement 5 (or second portion 15) which forms the leading edge 8. The second strands 13 forming the leading edge 8 thus allow rigidifying the area of the leading edge 8 and reducing the tangential displacement of the leading edge 8. Thus, the difference in tangential displacement between the leading edge 8 and the trailing edge 9 is more balanced, even zero. The pitch of the blade 3 is therefore little modified during the changes in the engine speed.

Applicant has noticed the fact that, despite the increase in the stiffness of the blade 3 in the area of the leading edge 8, it had no adverse effect on the behavior of the blade 3 in case of ingestion of objects because the deformations are mainly taken up by the metal shield 4.

The second portion 15 comprises both first strands 12 and second strands 13. However, this second portion 15 comprises more second strands 13 than first strands 12 in order to sufficiently increase the stiffness of the vane 7 in the area of the leading edge 8. Typically, the second portion 15 comprises between 70% and 90% of second strands 13. In one embodiment, only the first and second strands 12, 13 are used in the weaving of the second portion 15. The complement (namely between 30% and 10%, respectively) then consists of first strands 12.

In one embodiment, to ensure optimum use of the stiffness of the second strands 13 in the area of the leading edge 8, the second strands 13 can be placed as a skin, that is to say at the intrados and extrados faces of the blade 3. The skins, which are stiff, thus allow limiting the torsional and flexural deformations of the blade 3, and therefore reducing the difference in pitch angle.

The second portion 15 extends over the entire height h of the blade 3, from the root 6 to the tip 10, in order to increase the stiffness of the reinforcement 5 in the area of the leading edge 8 over its entire height h.

In order to adapt the stiffness of the area of the leading edge 8 as a function of the loads on the blade 3, which are directly linked to the engine speed (in particular for the pitch angle) and to the diameter of the fan (which determines the size of the birds that may be ingested and therefore the need for resistance to ingestion of the blade 3), the second portion 15 extends substantially axially over a portion of chord length L of the composite material structure which is variable between the root 6 and the tip 10 of the blade 3. By chord L, it will be meant here the straight line segment parallel to a tangential plane with respect to the axis X and which connects the leading edge 8 and the trailing edge 9.

Figure 2:
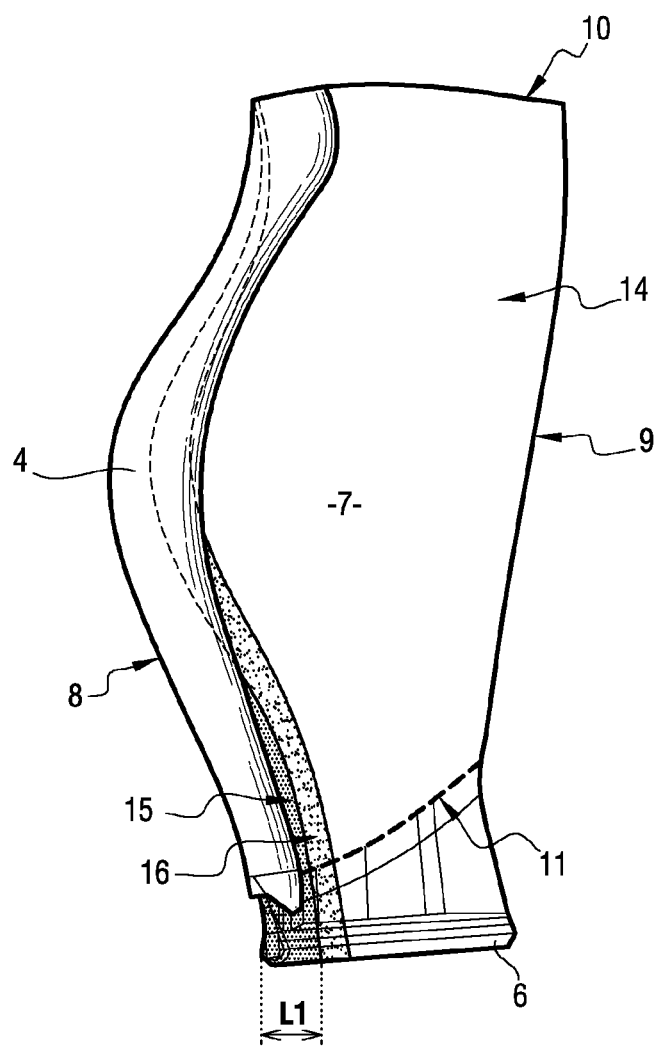
FIG. 2 is a side view of the blade comprising the fibrous reinforcement of FIG. 1, after injection of the matrix and fixing of a metal shield.

Thus, as represented in FIG. 2, the length of the second portion 15 can be sufficiently extended to exceed the end of the metal shield 4 over the first percentages of height h of the blade 3 (until mid-height h/2) because the ingestion loads are low at these heights. From 40% to 50% of height h, the length of the second portion 15 can gradually decrease to the tip 10 to meet the needs for resistance to ingestion, so that, on the upper half of the second portion 15 (i.e. the portion located radially outside with respect to the axis X), the second portion 15 is masked by the shield 4.

For example, within the root 6 of the blade 3, the second portion 15 extends over a length L1 comprised between 25% and 40% of the chord length L, for example over a length L1 equal to approximately one third of the chord length L at the root 6 of the blade. At mid-height h/2 of the blade 3, the second portion 15 extends over a length L2 comprised between 10% and 30% of the chord length, for example over a length L2 equal to about a quarter of the chord length at mid-height L of the blade 3. At the tip 10, on the other hand, the second portion 15 is very narrow or even has a zero length L3, because this area is generally highly ingestion loaded.

The reinforcement 5 further comprises a third portion 16 extending between the second portion 15 and the first portion 14 and within which the density of the second strands 13 gradually decreases from the second portion 15 towards the first portion 14, until the density of second strands 13 is zero. In one embodiment, only the first and second strands 12, 13 are used as warp yarns in the weaving of the third portion 16.

This third portion 16 is configured to serve as an interface between the first portion 14 and the second portion 15 in order to limit the weaknesses due to material discontinuities. When the first portion 14 and the second portion 15 are end to end in the reinforcement 5, the blade 3 thus obtained has effectively a reduced, even zero, difference in pitch angle whatever the engine speed. However, the Applicant has noticed the fact that in the absence of a third portion 16, that is to say by abruptly increasing the first strands 12 and simultaneously removing the second strands 13 at the interface between the first portion 14 and the second portion 15 of the fibrous reinforcement 5, the blade 3 obtained might be highly damaged at this interface in the event of an impact, since the interface between the two portions 14, 15 of the reinforcement 5 is weakened by the discontinuity of the properties of the materials.

The third portion 16 thus allows making a transition between the material properties of the first portion 14 and the material properties of the second portion 15. For that, the density of the first strands 12 is gradually increased within the third intermediate portion 16 from the second portion 15 to the first portion 14.

For example, the third portion 16 comprises in the vicinity of the second portion 15, between 50% and 30% of second strands 13, the complement (namely between 50% and 70%, respectively) then being constituted by first strands 12. The proportion of second strands 13 within the third portion 16 then gradually decreases until reaching 0% in the vicinity of the first portion 14, while the proportion of first strands 12 increases gradually and in a complementary manner until reaching 100% in the vicinity of the first portion 14.

In one embodiment, the third portion 16 extends over a length L4 comprised between 5% and 10% of the chord length L. The length L4 of the third portion 16 can be constant over the entire height h of the blade 3 in order to ensure a smooth transition between the second and the first portion 15, 14. Alternatively, the length L4 of the third portion 16 can be globally proportional to that of the second portion 15. In this variant, the length L4 of the third portion is maximum at the root 6 of the blade 3, then from 40% to 50% of height h, the length of the third portion 16 can gradually decrease until becoming substantially zero at the tip 10. Thus, from the mid-height h/2 of the blade 3, the third portion 16 is masked by the shield 4.

The first strands 12 and the second strands 13 can comprise carbon fibers.

For example, the first strands 12 can comprise HexTowl M7 carbon fibers marketed by HERCEL, whose Young's modulus is approximately 276 GPa.

The second strands 13 can comprise TORAYCA T1100G carbon fibers marketed by TORAY, whose Young's modulus is 294 GPa and/or Tenax UMS45 carbon fibers marketed by TEIJIN, whose Young's modulus is 425 GPa.

FIG. 1 schematically represents a blade 3 whose fibrous reinforcement 5 has been shaped from a three-dimensional woven fibrous preform, before resin injection or densification by a matrix and possible machining, in order to obtain a fan blade 3 made of composite material in accordance with the invention.

Figure 3:
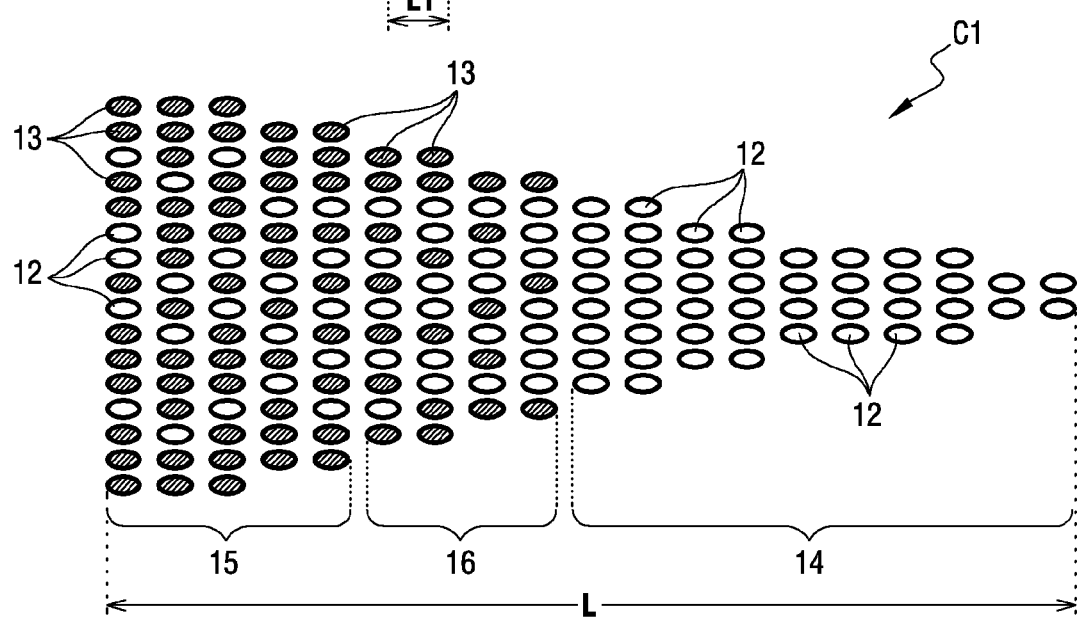
FIG. 3 illustrates one example of a warp plan of the fibrous reinforcement of FIG. 1 along a plane normal to the stacking axis Z, at the root of the blade.
Figure 4:
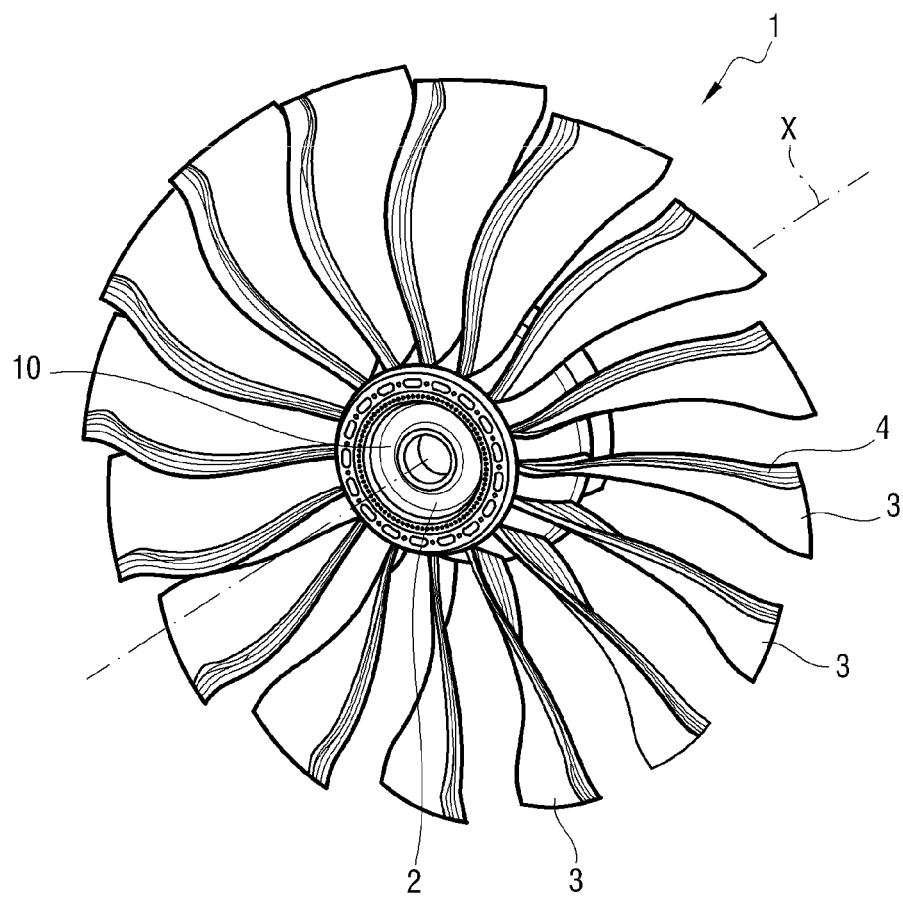
FIG. 4 is a perspective view of one exemplary embodiment of a fan comprising blades in accordance with the invention.
Figure 5:
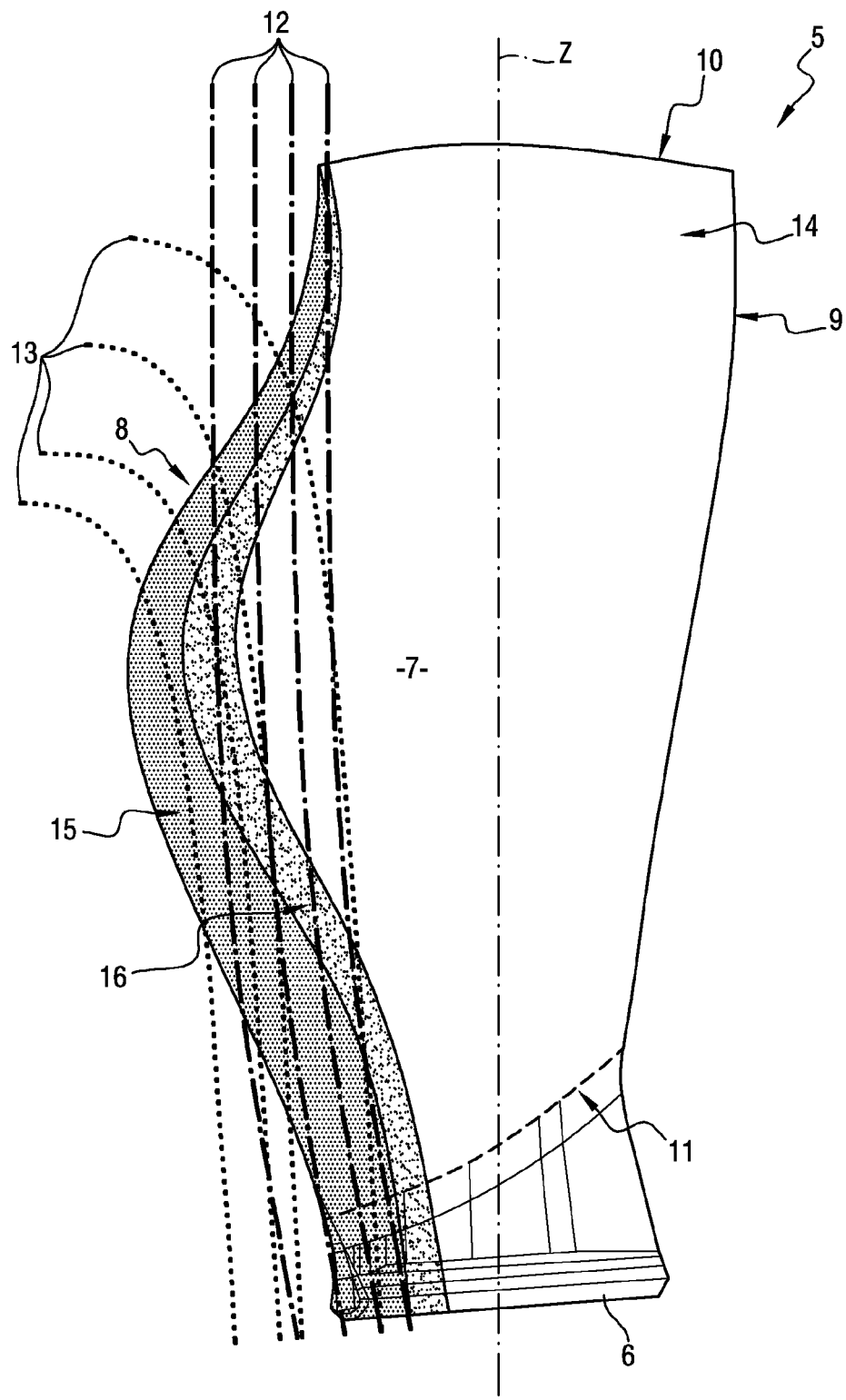
FIG. 5 schematically illustrates the weaving of the reinforcement of FIG. 1.

A schematic example of a warp plan Cl of the fibrous reinforcement 5 of FIG. 1 has been represented in FIG. 3. The warp plan Cl is a cross-sectional view of the fibrous preform along a plane normal to the stacking axis Z, at the root 6 of the blade 3 (see the cutting plane 3-3 in FIG. 1). In the fibrous reinforcement 5, each warp plan is separated from the immediately adjacent warp plan by a line of weft strands. It will be noted that FIG. 3 illustrates a warp plan Cl in which only the warp strands (that is to say in the stacking direction of the sections) have been represented, the weft strands having been omitted in order to simplify the reading of the figure. This FIG. 3 thus schematically illustrates a first example of hybridization of the warp strands.

As can be seen in FIG. 3, within the second portion 15 which here extends over approximately one third of the length of the chord L at the root 6 of the blade 3, between 70% and 90% of the warp strands are second strands 13, the complement being constituted by second strands 13. Within the third portion 16, the density of second strands 13 gradually decreases from the second portion 15 in the direction of the first portion 14, until becoming zero (the density of first strands 12 gradually increasing in a complementary manner). Within the first portion 14, 100% of the warp strands consist of first strands 12.

In general, the configurations described are valid for engines whose fan 1 can have an outside diameter on the order of 1.8 meters to 3 meters. The number of blades 3 of the fan 1 can be equal to 16 or 18. Whatever the diameter of the fan, the number of fan blades 3 will be reduced as much as possible. Among different criteria, a choice of parameters (in particular the length of the second portion 15 and the choice of the constituent material of the second strands 13) will depend more particularly on the behavior of the fan blade 3 and the "frequency/untwisting" combination of the blade 3.

The invention claimed is:

1. A fan blade of a turbomachine comprising a composite material structure comprising a fibrous reinforcement obtained by three-dimensional weaving of warp strands and weft strands and a matrix in which the fibrous reinforcement is embedded;
   wherein the composite material structure comprises a leading edge and a trailing edge;
   wherein the fibrous reinforcement comprises a first portion forming the trailing edge and a second portion forming the leading edge;
   wherein the warp strands comprise first strands having a predefined stiffness
and second strands having a stiffness greater than the stiffness of the first strands and a Young's modulus comprised between 1.2 and 1.5 times a Young's modulus of the first strands; and
wherein the first portion comprises all or part of the first strands and is devoid of second strands and the second portion comprises all or part of the second strands.

2. The fan blade according to claim 1, wherein the second portion further comprises first strands.

3. The fan blade according to claim 1, further comprising an airfoil vane having a tip and a root configured to be fixed to a disk of the fan, wherein the second portion extends over an entire height of the fan blade, from the root to the tip.

4. The fan blade according to claim 1, further comprising an airfoil vane having a tip and a root configured to be fixed to a disk of the fan, and in which the second portion extends over a chord length portion of the composite material structure which is variable between the root and the tip of the fan blade.

5. The fan blade according to claim 1, further comprising an airfoil vane having a tip and a root configured to be fixed to a disk of the fan and wherein, at the root of the fan blade, the second portion extends over a chord length portion comprised between 25% and 40% of the chord length of the composite material structure.

6. The fan blade according to claim 1, further comprising an airfoil vane having a tip and a root configured to be fixed to a disk of the fan; and a metal shield, added and fixed onto the leading edge, the second portion extending beyond the metal shield at the root but being completely covered by the metal shield at the tip.

7. The fan blade according to claim 6, wherein the second portion extends beyond the metal shield of the root up to 40% to 50% of a height of the fan blade and is completely covered by the metal shield from 50% to 100% of the height.

8. The fan blade according to claim 1, wherein, at mid-height of the fan blade, the second portion extends over a chord length portion comprised between 10% and 30% of the chord length of the composite material structure.

9. The fan blade according to claim 1 further comprising an airfoil vane having a tip and a root configured to be fixed to a disk of the fan and wherein, at the tip of the fan blade, the second portion extends over a chord length portion comprised between 0% and 5% of the chord length of the composite material structure.

10. The fan blade according to claim 1, wherein the fibrous reinforcement further comprises a third portion extending between the second portion and the first portion, a density of the second strands gradually decreasing in the third portion from the second portion towards the first portion.

11. The fan blade according to claim 10, wherein the third portion extends over a length comprised between 5% and 10% of a chord length of the composite material structure.

12. The fan blade according to claim 1, further comprising a metal shield added and fixed onto the leading edge, said metal shield covering the second portion and revealing the first portion.

13. The fan blade according to claim 1, wherein the first strands and the second strands comprise carbon fibers.

14. A fan for a turbomachine comprising a plurality of fan blades in accordance with claim 1 fixed to a fan disc.

15. A turbomachine comprising at least one fan according to claim 14 and inter-blade platforms.

* * * * *